H. W. JENNER.
NUT LOCK.
APPLICATION FILED AUG. 10, 1918.
1,308,285.
Patented July 1, 1919.
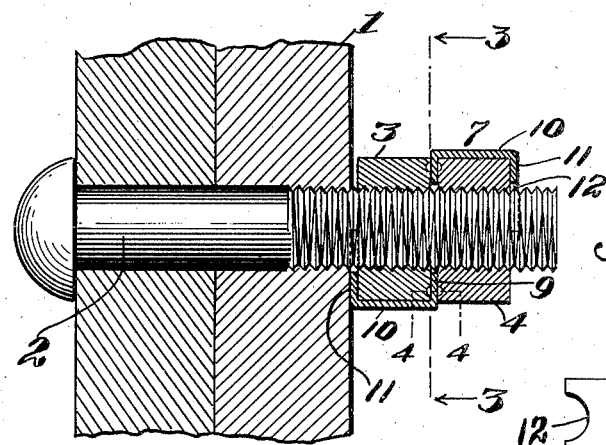
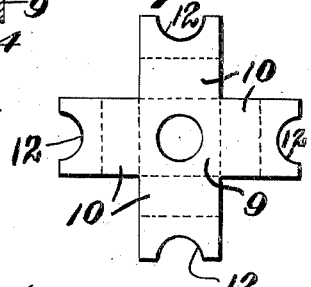
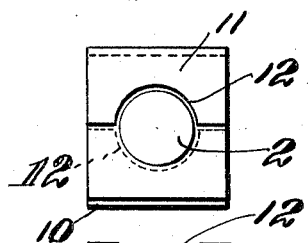
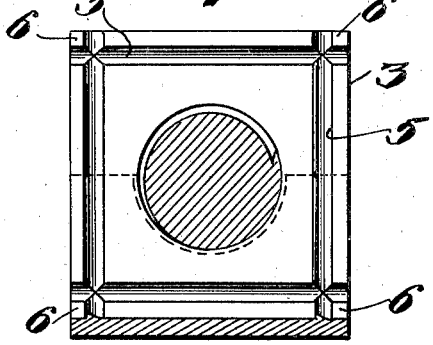
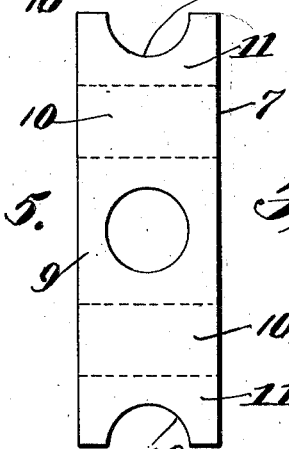
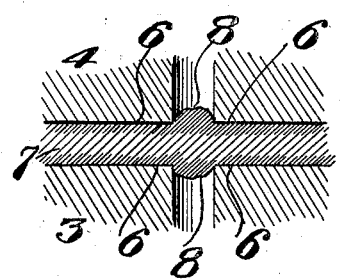
Inventor
H. W. Jenner.
By E. E. Vrooman &co.,
his Attorneys.

UNITED STATES PATENT OFFICE.

HORACE W. JENNER, OF LAWRENCEVILLE, ILLINOIS.

NUT-LOCK.

1,308,285.   Specification of Letters Patent.   Patented July 1, 1919.

Application filed August 10, 1918. Serial No. 249,297.

*To all whom it may concern:*

Be it known that I, HORACE W. JENNER, a citizen of the United States, residing at Lawrenceville, in the county of Lawrence and State of Illinois, have invented certain new and useful Improvements in Nut-Locks, of which the following is a specification, reference being had therein to the accompanying drawings.

This invention relates to certain new and useful improvements in nut locks, and more particularly to the construction of a ductile washer and a combination of the parts coöperating therewith.

The object of the invention is the construction of a simple and efficient nut locking structure that when assembled will not permit of the independent rotation of one nut with respect to the other upon a bolt.

Another object of the invention is the improvement of the construction of a nut lock structure based upon the disclosure in my prior United States Patent, No. 1,150,197, issued August 17, 1915.

With these and other objects in view, the invention comprises certain novel constructions and arrangements of parts as is clearly illustrated in the accompanying drawing, and more particularly pointed out in the following description and appended claims.

Figure 1 is a view, in elevation, of the bolt showing thereon a pair of nuts and a ductile washer assembled therewith.

Fig. 2 is an end view, in elevation, of the device.

Fig. 3 is a vertical sectional view taken on line 3—3, Fig. 1, and looking in the direction of the arrows.

Fig. 4 is an enlarged sectional view taken on line 4—4, Fig. 1.

Fig. 5 is a view showing the washer in blank form, prior to folding.

Fig. 6 is a view of another embodiment of the washer, similar to the embodiment shown in Fig. 5, prior to folding.

Referring to the drawings by numerals, 1 designates a suitable support and 2 a bolt carried by said support 1; the bolt 2, which is provided with right and left threads intersecting each other, is clearly shown in my prior Patent No. 1,150,197.

Upon the threaded portion of bolt 1, I position inner nut 3 and outer nut 4; the inner or contiguous faces of nuts 3 and 4 are similarly constructed, as shown in Fig. 3; each nut is provided with intersecting grooves 5, which grooves extend to the edge of each nut and produce square bearing or "clamping" teeth portions 6 at the corners of the nut, and which tooth portions, in my new combination just produced, performs a valuable function as hereinafter described.

It is to be noted that I do not cut my right and left threads on portions of the bolt 2 that are different in diameter, as usual in the art, but by reason of cutting the right and left threads upon a bolt of the same diameter throughout its length, it permits me to rotate the bolt, drawing or tightly "clamping" the nuts 3 and 4 together so that the ductile washer 7 will be tightly clamped between the contiguous faces of the nuts, resulting in the tooth portions 6 slightly, but sufficiently, forcing some of the metal of which washer 7 is made, into the intersecting grooves 5, as at 8, Fig. 4, thereby forming an additional lock for preventing the ductile washer from turning or wabbling prior to the outer ends of the washer being folded over the edges of the nuts and pressed tightly thereon, as shown in Fig. 1; the combination of the ductile washer together with the square tooth-acting portions 6 produces an efficient means for keeping washer 7 in alinement upon the nuts, prior to folding the washer over the nuts, Figs. 1 and 2.

My improved ductile washer comprises a centrally apertured body-portion 9 and with side nut-engaging portions 10 and over-lapping end portions 11; in each end portion 11 there is formed a notch or cut-away portion 12 for receiving the bolt as shown in Fig. 2, so that the ends of my ductile washer will rest snug around the bolt when the entire device is assembled, as shown in Figs. 1 and 2.

I wish it to be understood that I reserve the right to make such alterations and modifications in my invention as will be obvious to one skilled in the art to which my invention relates, and which alterations or modifications fairly fall within the scope of the appended claims.

What I claim is:

1. In a nut lock, the combination with the bolt of the same diameter throughout its length, said bolt being provided with right and left threads intersecting each other, of clamping nuts on the threaded portion of said bolts and capable of being drawn or clamped tightly together, a ductile washer on said bolt between said nuts, said washer adapted to be bent around opposite sides of the nuts and have its ends rest upon the outer faces of the nuts.

2. In a nut lock, the combination with a bolt, a pair of nuts upon said bolt, of a ductile washer interposed between said nuts and provided with notched outer ends, said washer adapted to be folded against opposite sides of the nuts and against the outer faces of the nuts, and said notched portions resting around parts of the bolt.

3. In a nut lock, the combination with a bolt of the same diameter throughout its length, said bolt provided with right and left threads intersecting each other, of a pair of nuts mounted upon said threads, one of said nuts provided with right hand threads, and the other nut provided with left hand threads, whereby the rotation of the bolt will tightly clamp the nuts together, each nut provided on its inner face with intersecting grooves extending to the edges of the nut, said grooves producing at the corners of each nut square tooth portions, a ductile washer positioned upon the threaded portion of the bolt and between said nuts and provided at its outer ends with notches, and said nuts by the rotation of the bolt being adapted to clamp tightly the washer at the square tooth portions at corners of the nuts and forces the metal slightly into the intersecting grooves for preventing the washer from accidentally rotating out of position, and the ends of the washer folded over the outer faces of the nuts and partly surrounding the threaded portion of the bolt, substantially as shown and described.

In testimony whereof I hereunto affix my signature.

HORACE W. JENNER.